(12) United States Patent
Zurke et al.

(10) Patent No.: US 9,117,577 B2
(45) Date of Patent: Aug. 25, 2015

(54) SOLENOID VALVE

(75) Inventors: Janusz Zurke, Straelen (DE); Rolf Dohrmann, Kaarst (DE)

(73) Assignee: PIERBURG GMBH, Neuss (DE)

( * ) Notice: Subject to any disclaimer, the term of this patent is extended or adjusted under 35 U.S.C. 154(b) by 427 days.

(21) Appl. No.: 12/988,519

(22) PCT Filed: Feb. 16, 2009

(86) PCT No.: PCT/EP2009/051782
§ 371 (c)(1),
(2), (4) Date: Oct. 19, 2010

(87) PCT Pub. No.: WO2009/130072
PCT Pub. Date: Oct. 29, 2009

(65) Prior Publication Data
US 2011/0037006 A1 Feb. 17, 2011

(30) Foreign Application Priority Data
Apr. 21, 2008 (DE) .......................... 10 2008 020 042

(51) Int. Cl.
*H01F 5/02* (2006.01)
*F16K 31/06* (2006.01)
*H01F 7/126* (2006.01)
*H01F 7/16* (2006.01)

(52) U.S. Cl.
CPC .............. *H01F 5/02* (2013.01); *F16K 31/0655* (2013.01); *H01F 7/126* (2013.01); *H01F 7/1607* (2013.01)

(58) Field of Classification Search
CPC ......... H01F 5/02; H01F 7/126; H01F 7/1607; F16K 31/0655
USPC .......... 251/129.01, 129.15; 335/297, 298, 299
See application file for complete search history.

(56) References Cited

U.S. PATENT DOCUMENTS

| | | | | |
|---|---|---|---|---|
| 2,675,831 | A | * | 4/1954 | Jacques .................... 137/625.48 |
| 3,214,534 | A | * | 10/1965 | Pihl ............................... 335/154 |
| 3,820,757 | A | * | 6/1974 | Siebel ....................... 251/129.21 |
| 4,247,044 | A | * | 1/1981 | Smith .............................. 239/87 |
| 4,468,647 | A | * | 8/1984 | Gibas ............................ 335/262 |
| 4,638,974 | A | | 1/1987 | Zeuner et al. |
| 4,954,799 | A | * | 9/1990 | Kumar .......................... 335/236 |
| 5,261,637 | A | * | 11/1993 | Curnow ................... 251/129.15 |
| 5,347,255 | A | * | 9/1994 | Saitoh et al. .................... 336/83 |
| 5,407,174 | A | * | 4/1995 | Kumar ..................... 251/129.08 |
| 5,424,704 | A | | 6/1995 | Dolle |
| 5,586,747 | A | | 12/1996 | Bennardo et al. |

(Continued)

FOREIGN PATENT DOCUMENTS

| CN | 258 444 6 Y | 11/2003 |
|---|---|---|
| DE | 30 47 712 A1 | 7/1982 |

(Continued)

*Primary Examiner* — Marina Tietjen
(74) *Attorney, Agent, or Firm* — Norman B. Thot

(57) ABSTRACT

A solenoid valve with an electromagnetic circuit includes a return plate, a yoke, a coil wound onto a coil carrier. The coil carrier includes an internal thread and comprises a dimensionally and temperature-stable material. A core includes an outer thread. The core is disposed in the coil carrier via a direct interlocking connection. The outer thread of the core is disposed within the internal thread of the coil carrier and is configured to provide adjustment for the core. An armature is configured to be movable and to act at least indirectly on a valve-closing element. The armature is supported in the coil carrier by a supporting device.

4 Claims, 1 Drawing Sheet

(56) References Cited

U.S. PATENT DOCUMENTS

| | | | |
|---|---|---|---|
| 6,339,366 | B1 | 1/2002 | Meisiek |
| 6,415,817 | B1 | 7/2002 | Krimmer et al. |
| 6,913,242 | B2* | 7/2005 | Reichert et al. .......... 251/129.18 |
| 7,106,158 | B2* | 9/2006 | Forsythe et al. ............... 335/220 |
| 2004/0082703 | A1* | 4/2004 | Arakawa et al. ............... 524/494 |
| 2005/0184263 | A1 | 8/2005 | Hiddessen et al. |
| 2006/0169936 | A1* | 8/2006 | Nonaka et al. ........... 251/129.02 |
| 2008/0105838 | A1* | 5/2008 | Koenekamp .................... 251/11 |
| 2008/0173840 | A1* | 7/2008 | Godert et al. ............ 251/129.15 |

FOREIGN PATENT DOCUMENTS

| | | |
|---|---|---|
| DE | 41 10 003 C1 | 7/1992 |
| DE | 41 39 670 A1 | 6/1993 |
| DE | 42 05 565 A1 | 8/1993 |
| DE | 694 17 630 T2 | 11/1999 |
| DE | 198 54 759 A1 | 5/2000 |
| DE | 199 01 090 A1 | 7/2000 |
| DE | 199 28 207 A1 | 12/2000 |
| DE | 200 09 969 U1 | 10/2001 |
| DE | 101 46 497 A1 | 4/2003 |
| DE | 20 2007 002 100 U1 | 5/2007 |
| EP | 0 660 016 A1 | 6/1995 |
| EP | 1 577 595 A | 9/2005 |
| JP | 59-103406 U | 7/1984 |
| JP | 59-107380 U | 7/1984 |
| JP | 62-000872 U | 1/1987 |
| JP | 64-051765 U | 3/1989 |
| JP | 02-076280 U | 6/1990 |
| JP | 04-005574 U | 1/1992 |
| JP | H 0479 A | 1/1992 |
| JP | H 07-057932 A | 3/1995 |
| JP | 08-003440 A | 1/1996 |
| JP | 2002-155203 A | 5/2002 |
| JP | 2003-502600 A | 1/2003 |
| JP | 2003-134781 A | 5/2003 |
| JP | 2006-097806 | 4/2006 |
| JP | 2010-013571 A | 1/2010 |

* cited by examiner

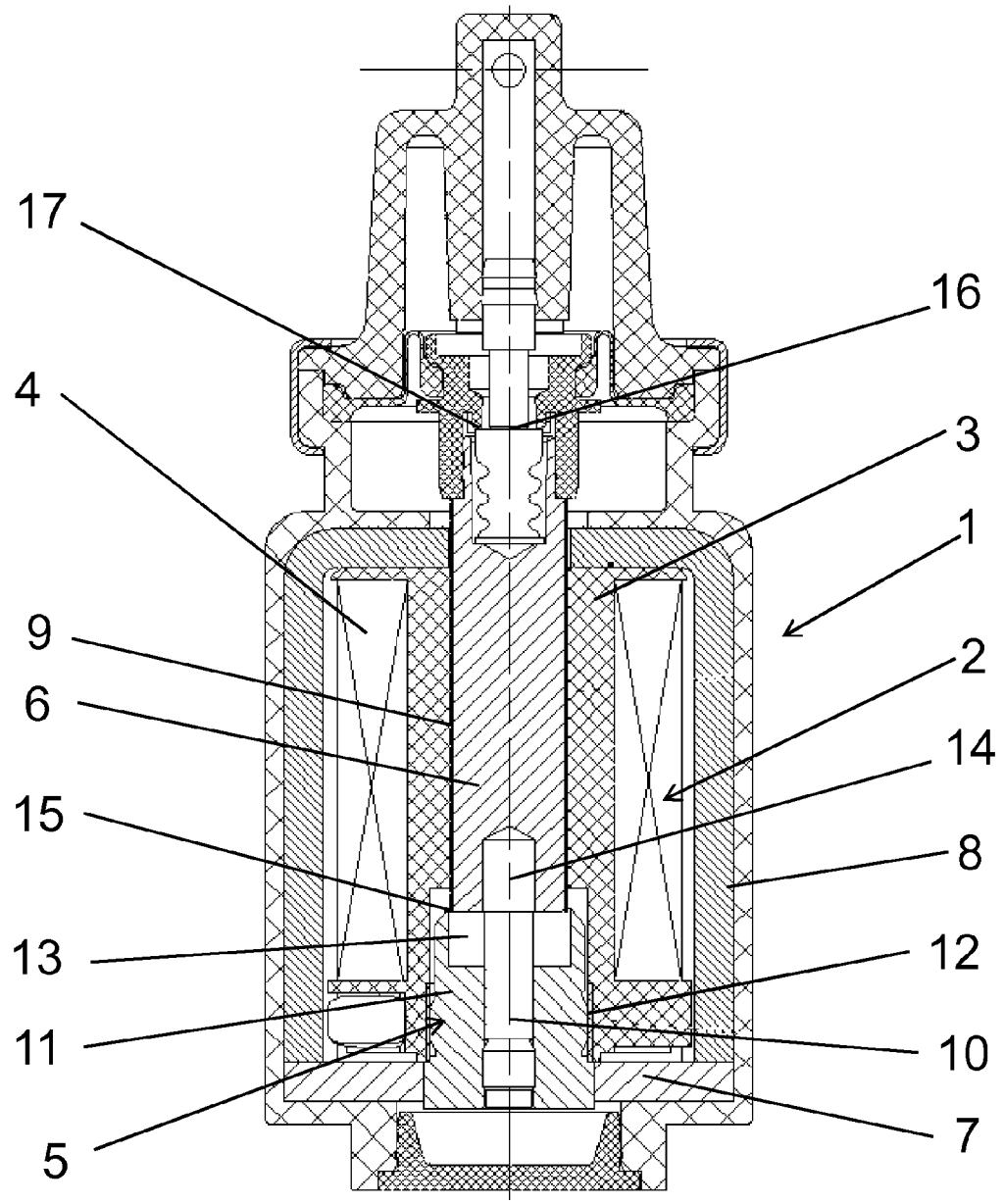

SOLENOID VALVE

CROSS REFERENCE TO PRIOR APPLICATIONS

This application is a U.S. National Phase application under 35 U.S.C. §371 of International Application No. PCT/EP2009/051782, filed on Feb. 16, 2009 and which claims benefit to German Patent Application No. 10 2008 020 042.5, filed on Apr. 21, 2008. The International Application was published in German on Oct. 29, 2009 as WO 2009/130072 A1 under PCT Article 21(2).

FIELD

The present invention provides a solenoid valve with an electromagnetic circuit which comprises a coil wound onto a coil carrier, an armature, an adjustable core, a return plate and a yoke, wherein the movable armature is supported in the coil carrier using means and acts at least indirectly on a valve-closing element.

BACKGROUND

Many different fields of application are known for solenoid valves in internal combustion engines. For instance, solenoid valves are used both in pneumatic and in hydraulic circuits of vehicles, such as, for example, in brake systems, operating systems or also injection systems. They can also be used for pressure control in pneumatic actuators or, for example, as circulation-type slide valves of turbochargers. Depending on the respective application, these solenoid valves are designed either as on/off valves or as control valves. Particularly when using such valves as regulation or control valves, it is important to prevent a coaxial offset of the armature in the magnetic circuit because this would cause radial forces having a negative influence on the desired axial forces.

A solenoid valve of the above type is described, for example, in DE 41 10 003 C1 and DE 42 05 565 C2. The described electropneumatic pressure transducer comprises a core screwed into a threaded bush wherein said threaded bush can also be integral with the return plate. The opportunity to perform a defined adjustment of the iron core makes it possible to eliminate all influences of mechanical and electromagnetic tolerances. Additional fine-adjustment is rendered possible by arranging, in the core, a further core which can extend into a recess of the armature. The armature is supported in one or several bearings which in turn are arranged in a steel bush, said steel bush being provided in the coil carrier. In such an arrangement, alignment errors between the components for guiding the anchor or fixing the core will cause a non-negligible coaxial error of the armature relative to the core. Deformation of the coil carrier as caused by winding the coil during assembly of the electromagnetic circuit, or by the process of injection-molding the housing, will also result in a further increase of the coaxial error.

A further embodiment of a solenoid valve for control purposes is described in DE 101 46 497 A1. In this valve, a hollow cylindrical armature is supported directly in a correspondingly configured coil carrier which thus serves as a slide bearing for the armature, and which is made of injection-molded plastic. The core is fastened in the housing by means of a connection nipple and extends into the area of the coil carrier, thus serving at the same time as a further valve seat for a valve closure member which is connected to the armature. In such an arrangement, coaxial errors also cannot be avoided because the coil will be wound around the coil carrier after the injection-molding process.

A further possibility for avoiding a coaxial error is described in DE 20 2007 002 100 U1. In this electromagnetic actuator, a centering bush is provided, accommodating the bearing guide elements of the armature system as well as the iron core.

Due to the high expenditure for component parts and assembly, all of the above outlined approaches for avoiding a coaxial error, particularly in a solenoid valve with an adjustable core, will cause considerable costs.

SUMMARY

An aspect of the present invention to provide a solenoid valve in which the occurring coaxial errors are minimized while requiring the smallest possible number of component parts and the smallest possible expenditure for assembly.

In an embodiment, the present invention provides a solenoid valve with an electromagnetic circuit which includes a return plate, a yoke, a coil wound onto a coil carrier. The coil carrier includes an internal thread and comprises a dimensionally and temperature-stable material. A core includes an outer thread. The core is disposed in the coil carrier via a direct interlocking connection. The outer thread of the core is disposed within the internal thread of the coil carrier and is configured to provide adjustment for the core. An armature is configured to be movable and to act at least indirectly on a valve-closing element. The armature is supported in the coil carrier by a supporting device].

BRIEF DESCRIPTION OF THE DRAWING

The present invention is described in greater detail below on the basis of embodiments and of the drawing which shows an embodiment of a solenoid valve.

DETAILED DESCRIPTION

The solenoid valve of the present invention can be produced in a particularly inexpensive manner and avoid coaxial offset between the core and the armature.

In an embodiment of the present invention, the coil carrier can comprise an internal thread, with the core arranged therein while being adjustable with the aid of an external thread. In this case, however, the core should also be held by an additional securing member. It is also possible to provide the core with a self-tapping external thread by which the core can be adjustably arranged in the coil carrier. For bearing support of the armature, a slide bearing bush can be provided in the coil carrier. A further option resides in providing a sliding layer between the armature and the inner side of the coil carrier. Dimensionally stable and temperature-stable materials such as, for example, Grivory® HT2V-3H LF or Grivory® XE3881, have proven to be useful.

The electromagnetic circuit 2, shown in the drawing, of a solenoid valve 1 which here is realized as an electropneumatic transducer, comprises a coil carrier 3 with a coil 4 wound thereon, and a core 5 arranged in the interior of said coil carrier 3 and being magnetically coupled to a moveable armature 6 likewise arranged in the interior of coil carrier 3. The electromagnetic circuit 2 is closed by a return plate 7 on a first axial end of coil carrier 3 as well as by a yoke 8. In the present case, the coil carrier is made of the material Grivory® HT2V-3H LF.

The yoke 8 surrounds the coil carrier 3 together with coil 4 wound thereon. In the present embodiment, the armature 6 is provided with a sliding layer 9 and thus is arranged within coil carrier 3 in a slideable manner.

Core 5 is of a two-part design and comprises an inner core member 10 and an outer core member 11 with a self-tapping thread 12, said outer core member 11 radially surrounding said inner core member 10 and being arranged coaxially thereto. Outer core member 11 further comprises an internal thread cooperating with an external thread of inner core member 10, with inner core member 10 extending into a corresponding circular recess 14 of armature 6. Also outer core member 11 comprises a circular recess 13 formed at the end located toward armature 6, wherein the diameter of recess 13 is slightly larger than the outer diameter of armature 6 so that, when the solenoid is actuated, armature 6 can slightly enter into recess 13. The recesses serves to bundle the electromagnetic field lines.

Core 5 is tightly connected to coil carrier 3 via said self-tapping thread 12 of outer core member 11 and is in abutment on return plate 7. Return plate 7 itself is connected to yoke 8. Accordingly, the electromagnetic field lines generated by energizing the coil 4 will take a course through armature 6 and core 5 along return plate 7 and yoke 8.

In the non-energized state, a gap 15 exists between armature 6 and core 5, in which gap a magnetic field is generated when coil 4 is energized, resulting in an axial movement of armature 6. Thus, upon energization of coil 4, that axial end of armature 6 that is located opposite to core 5 will be lifted off a valve seat 17 with a valve surface 16. The further functions of the electropneumatic transducer are irrelevant for the present invention. In this regard, reference is made to the cited state of the art. Of essence herein is the possibility of effecting, by movement of the armature 6, a movement of a closure member coupled thereto, whereby a fluidic connection can be generated between an inlet channel and an outlet channel, not shown.

The two-part configuration of core 5 serves for fine-adjustment of the air gap between armature 6 and core 5 and thus for changing the magnetic characteristic, thus allowing for adjustment of the force acting on armature 6. Coarse adjustment can be performed by the self-tapping thread of outer core member 11.

An alternative embodiment resides in that an external thread of outer core member 11 cooperates with an internal thread provided in coil carrier 3 and is kept in the set state by a securing member. Said securing member can be an inserted pin, a soldering or welding site or the like. It is also possible to provide other bearing supports for the armature, such as, for example, a slide bearing bush arranged in the coil carrier.

The present invention is not limited to embodiments described herein; reference should be had to the appended claims.

The invention claimed is:

1. A solenoid valve with an electromagnetic circuit, the solenoid valve comprising:
    a return plate;
    a yoke;
    a coil wound onto a coil carrier, the coil carrier comprising an internal thread;
    a two part core comprising an inner core member with an external thread and an outer core member with both an internal thread and an outer thread, the internal thread of the outer core member being configured to cooperate with the outer thread of the inner core member, the two part core being disposed in the coil carrier so that a direct interlocking connection exists between the outer thread of the two part core and the internal thread of the coil carrier, the outer thread of the two part core being disposed within the internal thread of the coil carrier and configured to provide an adjustment for the two part core; and
    an armature configured to be movable and to act at least indirectly on a valve-closing element, the armature being directly supported by the coil carrier,
    wherein, an adjustment of the two part core changes a magnetic characteristic of electromagnetic field lines through the armature, the two part core, the return plate, and the yoke, so as to thereby adjust a force acting on the armature.

2. The solenoid valve as recited in claim 1, wherein the coil carrier further comprises a supporting device which is configured as a slide bearing bush.

3. The solenoid valve as recited in claim 1, wherein the armature comprises a sliding layer, the sliding layer is arranged between the armature and an inner side of the coil carrier, and the sliding layer is configured to support the armature.

4. The solenoid valve as recited in claim 1, wherein the coil carrier comprises a glass fiber reinforced (30%), polytetrafluoroethylene (PTFE) modified engineering thermoplastic based on semi-crystalline partially aromatic copolyamid.

* * * * *